United States Patent [19]
Petrella et al.

[11] Patent Number: 5,946,395
[45] Date of Patent: Aug. 31, 1999

[54] HOUSING ASSEMBLY FOR AN ELECTRONIC DEVICE

[75] Inventors: Thomas Anthony Petrella, Burlington, Wis.; Rudy Yorio, Pompano Beach, Fla.; Marlon George Inskip Dasent, Grayslake, Ill.

[73] Assignee: Motorola, Inc., Schaumburg, Ill.

[21] Appl. No.: 08/920,404

[22] Filed: Aug. 29, 1997

[51] Int. Cl.⁶ .................................................. H04M 1/00
[52] U.S. Cl. ............................................................ 379/433
[58] Field of Search .................................... 379/428, 433, 379/454, 447, 446; 220/681, 4.26, 23.4

[56] References Cited

U.S. PATENT DOCUMENTS 5,371,791  12/1994  Schwartz et al. .
5,604,050   2/1997  Brunette et al. .
5,660,945   8/1997  McCormick et al. .
5,814,765   9/1998  Bauer et al. .......................... 174/50.54

OTHER PUBLICATIONS

Bravo Express™ Operating Instructions, Paging and Telepoint Systems Group, Boynton Beach, FL, Motorola, Inc., 1992.

Memo Express™ User's Guide, Paging Products Group, Boynton Beach, FL, Motorola, Inc., 1993, 1994, pp. 2–15.

*Primary Examiner*—Jack Chiang
*Attorney, Agent, or Firm*—John J. Oskorep; Brian M. Mancini

[57] ABSTRACT

A housing assembly (100) for an electronic device includes a first housing portion (102), a second housing portion (104), and a slidable element (106). The first and the second housing portions (102, 104) are configured to mate to form a housing (412). The slidable element (106) is slidably disposed in the housing (412), and is configured to fasten the first and the second housing portions (102, 104) when in a first position and unfasten the first and the second housing portions (102, 104) when in a second position. The housing (412) defines an opening (198) to access a positioning tab (123) of the ridable element (106).

22 Claims, 5 Drawing Sheets

HOUSING ASSEMBLY FOR AN ELECTRONIC DEVICE

FIELD OF THE INVENTION

The present invention relates generally to the field of housing assemblies for electronic devices, and more particularly to housing assemblies for portable communication devices.

BACKGROUND OF THE INVENTION

Housing assemblies for electronic devices are known in the art. Typically, a housing assembly includes two or more housing portions mechanically connected via screws or snaps. Housing portions assembled with screws typically provide a secure attachment but take much time to assemble and disassemble. The quality of such attachment may be poor since one or more of the several screws required may be missing or may not be fully fastened. Housing portions assembled with snaps typically provide either a weak attachment with an easy disassembly or a strong attachment with a difficult disassembly.

Other housing assemblies of devices, such as housing assemblies for pagers, include housing portions having slidable pieces positioned along outside walls of the devices for accessing batteries. Such a housing assembly undesirably includes screws and has an outward appearance that is compromised by the fully-exposed, slidable piece. Such concerns are important in portable communication devices such as cordless and cellular telephones.

Accordingly, what is needed is a housing assembly that is easy to assemble and disassemble, and one that provides a secure attachment and attractive appearance when assembled.

DETAILED DESCRIPTION OF THE PREFERRED EMBODIMENTS

A housing assembly for an electronic device includes a first housing portion, a second housing portion, and a slidable element. The first and the second housing portions are configured to mate to form a housing. The slidable element is slidably disposed in the housing and is configured to fasten the first and the second housing portions when in a first position and unfasten the first and the second housing portions when in a second position.

Figure 1:
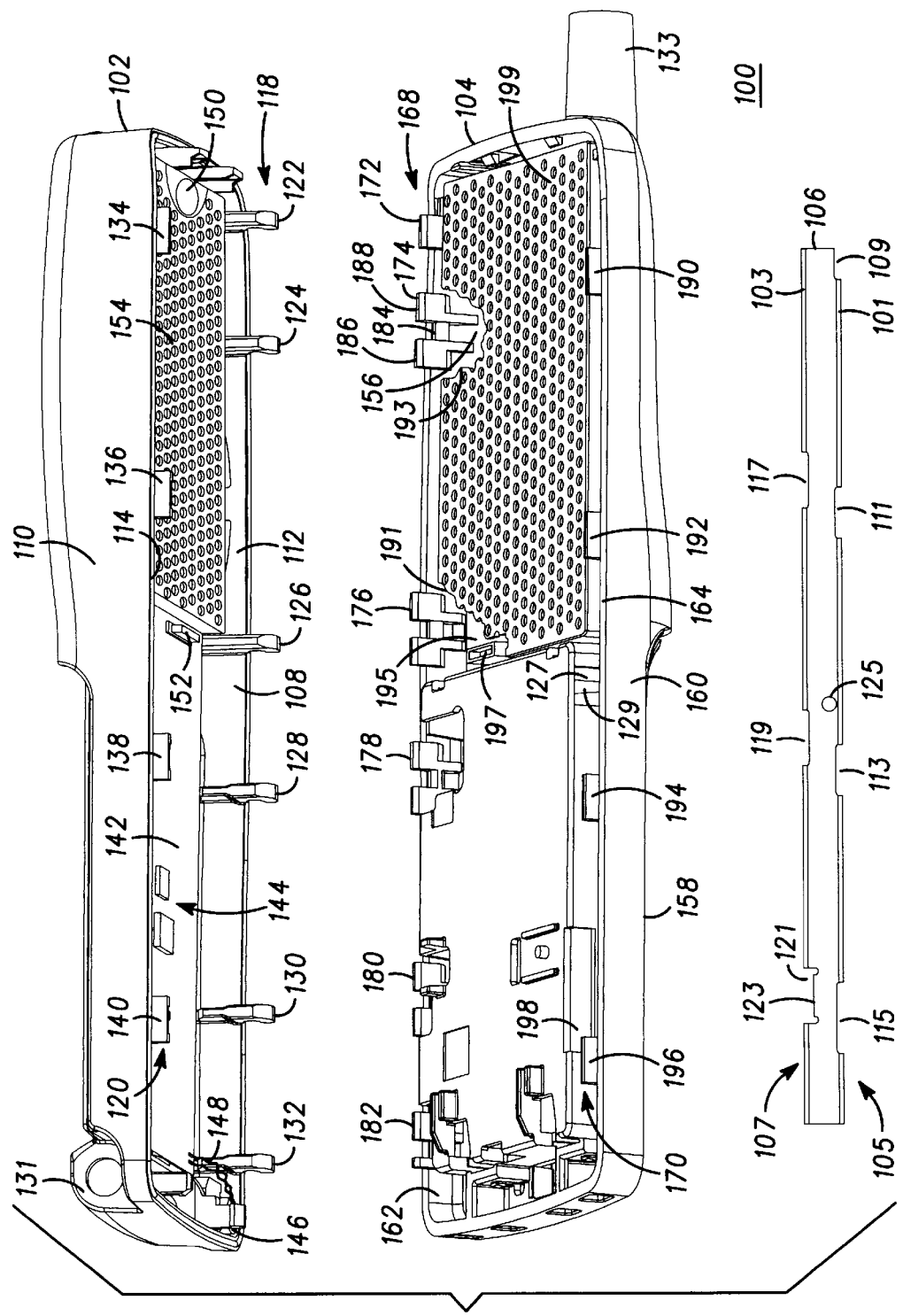
FIG. 1 shows an exploded view of a housing assembly including a first housing portion, a second housing portion, and a slidable element.

FIG. 1 shows an exploded view of a housing assembly 100 for an electronic device. Housing assembly 100 includes housing portion 102, a housing portion 104, and a slidable element 106. In the embodiment shown, housing assembly 100 is sized and constructed for use in a portable communication device such as a cordless or cellular telephone using radio frequency (RF) signals for communication.

Housing portion 102 defines a housing shell, which includes a cavity 108 having walls 110 and 112. Tops of walls 110 and 112 define a mating perimeter 114. A plurality of tabs 120 are defined along an inside surface and a length of wall 110, and a plurality of hooks 118 are defined along an inside surface and a length of wall 112. In the embodiment shown, the plurality of tabs 120 include four tabs, tabs 134, 136, 138, and 140. In addition, the plurality of hooks 118 include six hooks, hooks 122, 124, 126, 128, 130, and 132. Housing portion 102 also defines a hinge portion 131 to receive a rotatable keypad cover (not shown) common to many cordless and cellular telephones.

Like housing portion 102, housing portion 104 forms a housing shell, which includes a cavity 156 having walls 160 and 162. Tops of walls 160 and 162 define a mating perimeter 164, which is sized and shaped to meet mating perimeter 114 when juxtaposed therewith. A plurality of tabs 170 are defined along an inside surface and a length of wall 160, and a plurality of hook acceptors 168 are defined along an inside surface and a length of wall 162. The plurality of tabs 170 are staggered in relation to the plurality of tabs 120, which is shown more clearly in FIG. 3 when housing portions 102 and 104 are partially mated.

Referring back to FIG. 1, cutaways 191 and 193 reveal that most of the plurality of hook acceptors 168, such as hook acceptor 174, include a receiving member 184 surrounded by containment tabs 186 and 188. In the embodiment shown, the plurality of tabs 170 include four tabs, tabs 190, 192, 194, and 196. In addition, the plurality of hook acceptors 168 include six hook acceptors, hook acceptors 172, 174, 176, 178, 180, and 182.

Housing portion 104 also defines a recess 158 (shown more clearly in FIG. 4), which forms a battery compartment or battery attachment area of housing portion 104, an opening 198 in recess 158, an opening 127 in recess 158, a detent 129 positioned in opening 127, and an antenna portion 133 to receive a retractable antenna (not shown).

Referring back to housing portion 102, cavity 108 is sized to fit a printed circuit board (PCB) 142 having electronic components 144 disposed thereon. A radio frequency (RF) shield 154 is provided on a portion of PCB 142 to minimize RF interference to and from some of electronic components 144. A male connector 152 is mechanically and electrically coupled to PCB 142. A microphone 146 is disposed in cavity 108 and includes wires 148 connected to PCB 142. A speaker 150 is also disposed in cavity 108 and is likewise connected to PCB 142.

Cavity 156 defined by housing portion 104 is also sized to fit a PCB, namely a PCB 195 having electronic components (not visible) disposed thereon. An RF shield 199 is provided on a portion of PCB 195 to minimize RF interference. A female connector 197, which is sized and constructed to mate with male connector 152, is mechanically and electrically coupled to PCB 195.

Figure 4:
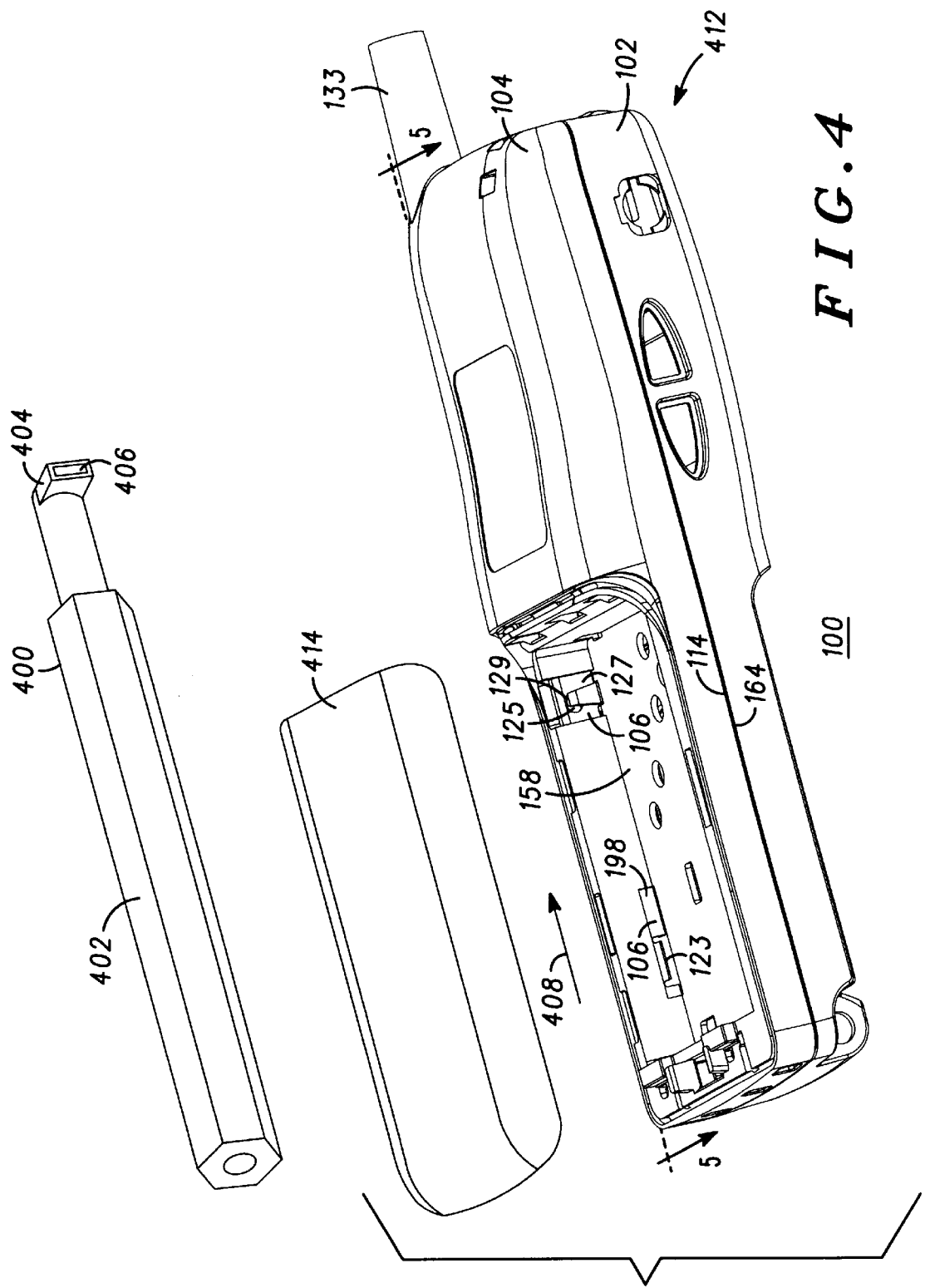
FIG. 4 shows a partially assembled view of the housing assembly with the slidable element positioned such that the first and the second housing portions are in an unfastened configuration.

As shown in FIG. 4, housing portions 102 and 104 are sized and constructed to mate and form a housing 412 for the portable communication device. In the embodiment described, housing 412 is sized for hand-held usage, and has a length of approximately 12 cm and a width of approximately 4.3 cm. Also, housing portions 102 and 104 are made from a durable material, such as plastic. Preferably, housing portions 102 and 104 are made from LEXAN™ polycarbonate, manufactured by General Electric, Inc.

Referring back to FIG. 1, slidable element 106 defines a track, which includes a rail 101 and a rail 103, a plurality of slots 105, a plurality of slots 107, a positioning tab 123, and a hole 125. The plurality of slots 105 are defined along a length of rail 101, and the plurality of slots 107 are defined along a length of rail 103. The plurality of slots 105 are staggered in relation to the plurality of slots 107. In the embodiment shown, the plurality of slots 105 include four slots, slots 109, 111, 113, and 115, and the plurality of slots 107 include three slots, slots 117, 119, and 121. Slidable element 106 is made from a stiff material, such as metal. Preferably, slidable element 106 is made from a half-hard, 300-series stainless steel. Slidable element 106 is sized to fit within housing 412 and, in the embodiment described, has a length of approximately 9.9 cm and a width of approximately 5 mm. Most of the pluralities of slots 105 and 107 have a length of approximately 5 mm.

Before housing portions 102 and 104 are mated, slidable element 106 is properly slidably disposed along the inside surface of wall 160 in housing 412. When properly disposed therein, as it is in FIG. 4, slidable element 106 is slidable to a loaded position, an open position, and a closed position. The open position may also be referred to as an unfastened position, an unlocked position, or a released position. The closed position may also be referred to as a fastened position or a locked position.

Figure 5:
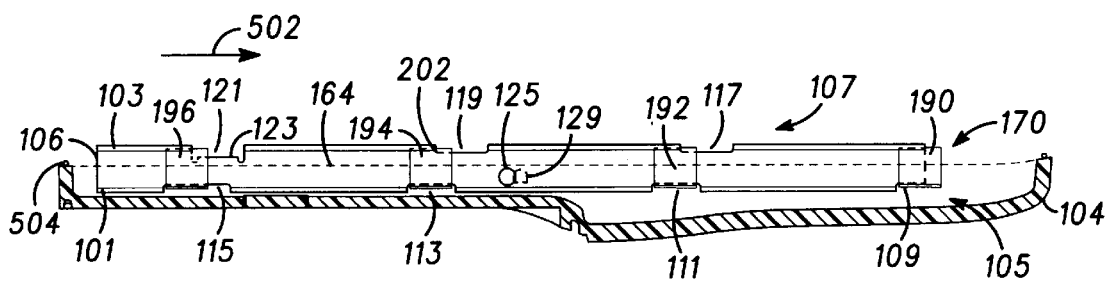
FIG. 5 shows a cross-sectional view of the housing assembly taken along line 5–5' of FIG. 4, with the slidable element positioned in a loaded position and the first housing portion removed.
Figure 6:
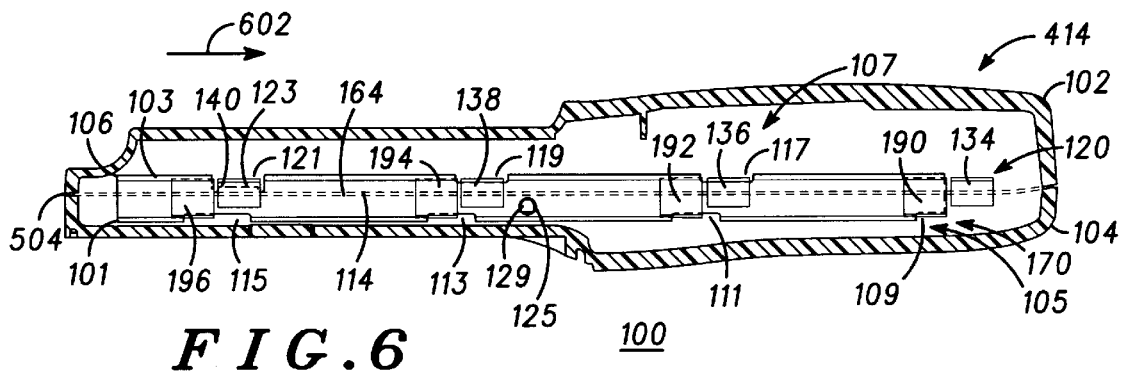
FIG. 6 shows the cross-sectional view of the housing assembly with the slidable element positioned such that the first and the second housing portions are in the unfastened configuration.
Figure 7:
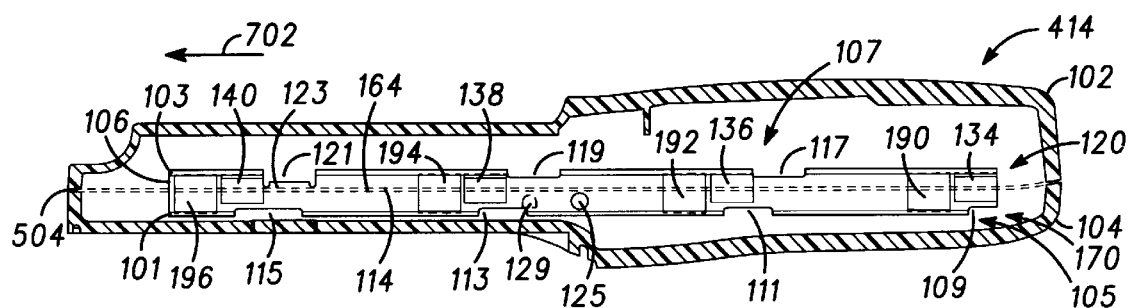
FIG. 7 shows the cross-sectional view of the housing assembly with the slidable element positioned such that the first and the second housing portions are in a fastened configuration.

FIGS. 5–7 are cross-sectional views taken along line 5–5' of FIG. 4 and show the various positions of slidable element 106. FIG. 5 shows slidable element 106 in the loaded position with housing portion 102 removed; FIG. 6 shows slidable element 106 in the open position; and FIG. 7 shows slidable element 106 in the closed position. As described in more detail below, housing portions 102 and 104 are unfastened or are in an unfastened configuration when slidable element 106 is in the open or unfastened position (FIG. 6), and housing portions 102 and 104 are fastened together or are in a fastened configuration when slidable element 106 is in the closed or fastened position (FIG. 7). Note that other housing elements and components of housing assembly 100, particularly most elements and components disposed in front of slidable element 106, are not shown in FIGS. 5–7 for clarity. In addition, dashed lines of FIGS. 5–7 showing mating perimeters 114 and 164 are shown only for illustrative purposes.

Figure 2:
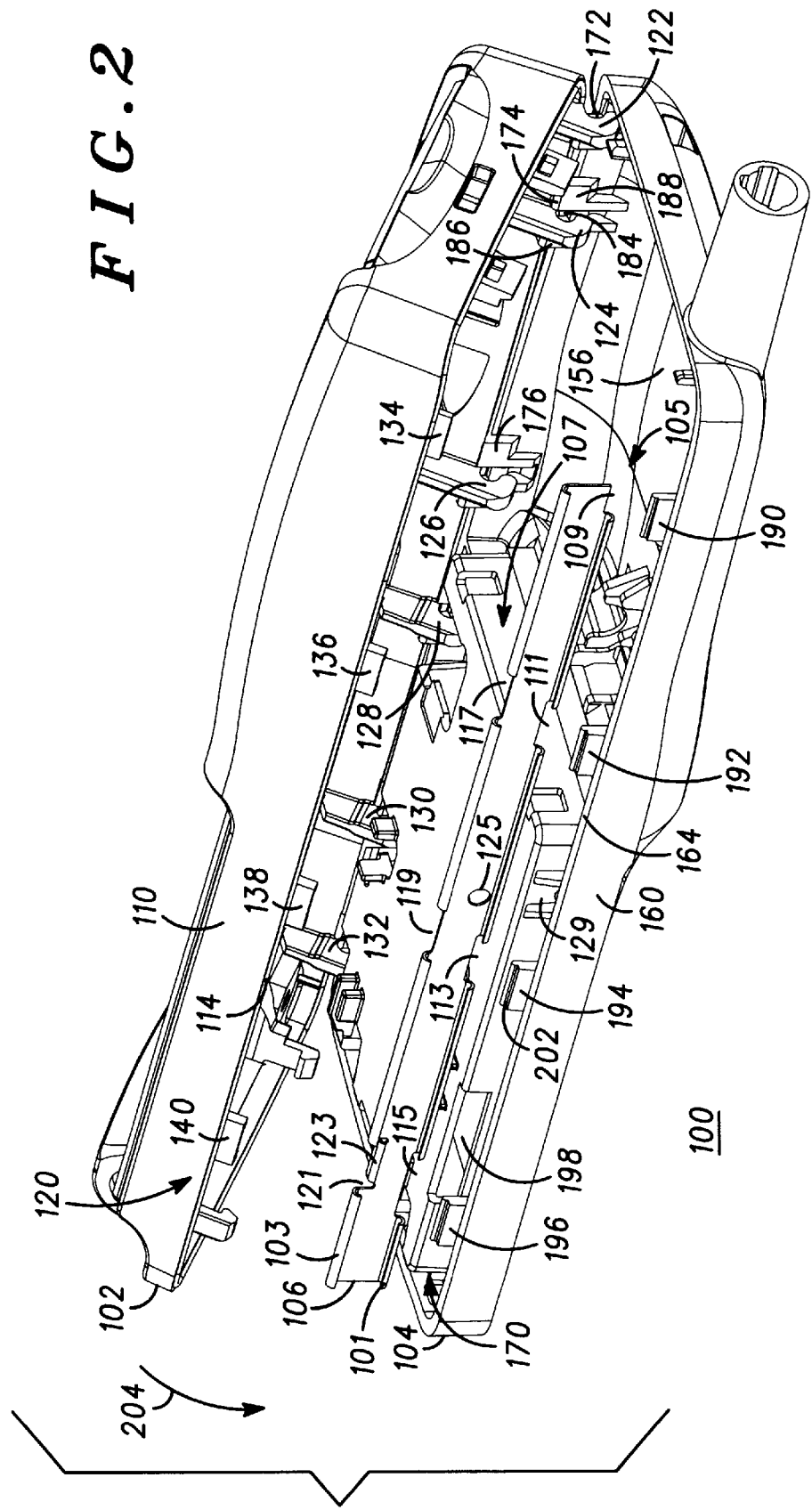
FIG. 2 shows a partially exploded view of the housing assembly of FIG. 1, where the first and the second housing portions are connected on a hinged side.

Housing assembly 100 may be assembled as follows. Referring to FIG. 2, slidable element 106 is aligned with wall 160 above cavity 156 where slots 109, 111, 113 and 115 are positioned above tabs 190, 192, 194, and 196, respectively. Slidable element 106 is then inserted in housing portion 104 where slots 109, 111, 113 and 115 allow tabs 190, 192, 194, and 196 to insert therethrough, respectively, to the extent that ends of tabs 190, 192, 194, and 196 make contact with rail 103. Outside edges of tabs 190, 192, 194, and 196 have small rails defined thereon, such as a small rail 202 on tab 194, which insert within rail 103. Here, slidable element 106 is in the loaded position as shown in FIG. 5. Tabs 190, 192, 194, and 196 are positioned within the track formed by rails 101 and 103, but are not fully captured or retained therein since tabs 190, 192, 194, and 196 are still aligned with slots 109, 111, 113, and 115, respectively. Positioning tab 123 is positioned near and partially extending through opening 198 (FIG. 2).

Next, slidable element 106 is slidably positioned along tabs 190, 192, 194, and 196, in a direction indicated by an arrow 502 of FIG. 5, to the extent that detent 129 engages hole 125. From such movement, slots 109, 111, 113, and 115 have been repositioned such that tabs 190, 192, 194, and 196 are captured and retained within rails 101 and 103. Here, slidable element 106 is in the open position.

Next, referring back to FIGS. 1 and 2, housing portion 102 is positioned toward housing portion 104 such that the plurality of hooks 118 meet with the plurality of hook acceptors 168 to form a hinged side (FIG. 2). For example, when hook 124 meets hook acceptor 174, hook 124 is hinged around receiving member 184 and contained within containment tabs 186 and 188. The hinged side is positioned along walls 112 and 162 on a side opposite slidable element 106 and provides a partial rotatable movement for housing portions 102 and 104 in a direction indicated by an arrow 204.

Figure 3:
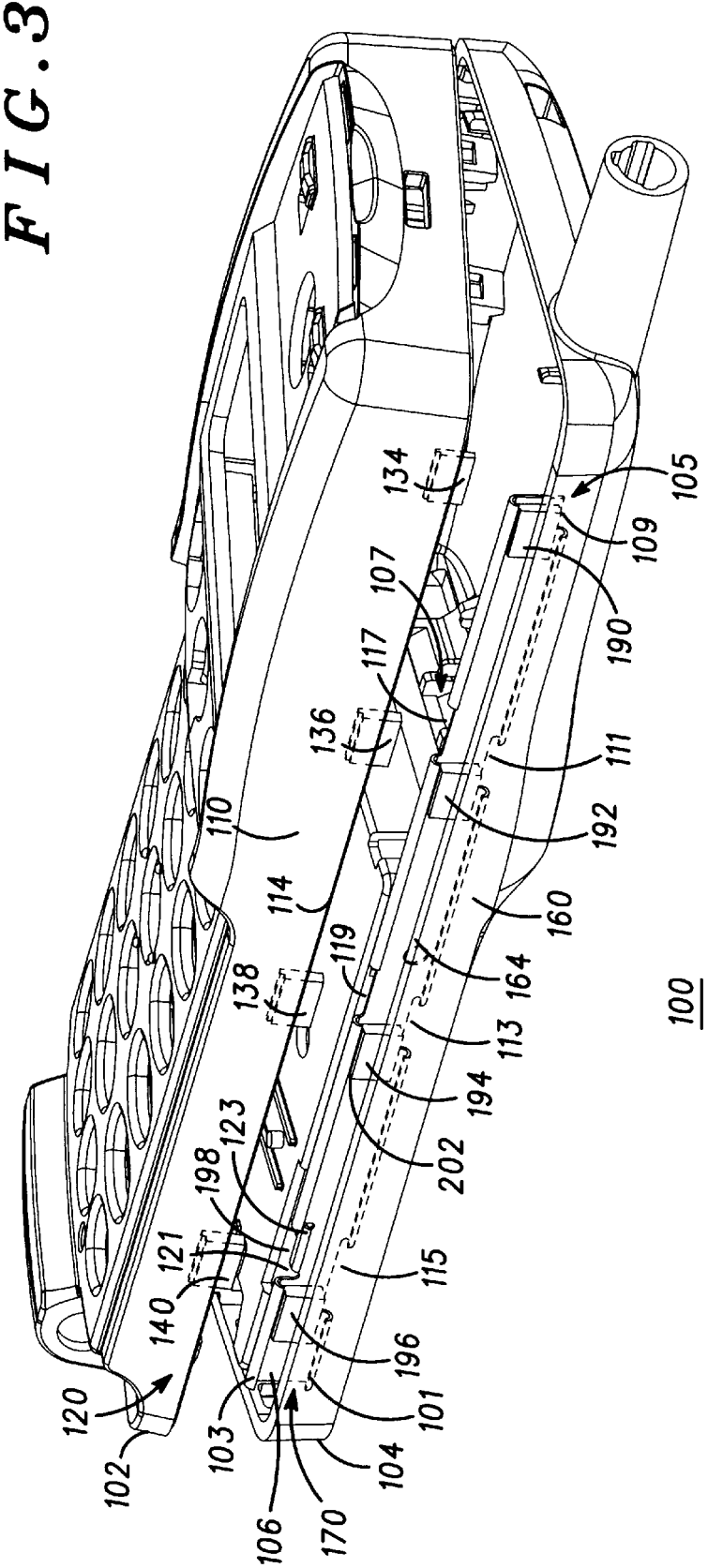
FIG. 3 shows a partially assembled view of the housing assembly, where the first and the second housing portions are connected on the hinged side and the slidable element is slidably disposed on the second housing portion.

FIG. 3 shows housing portion 102 hinged to housing portion 104 where slidable element 106 is slidably disposed on housing portion 104 in the open position. Dashed lines in FIG. 3 are shown for illustrative purposes only. As shown, when slidable element 106 is positioned in the opened position, the plurality of slots 107 are positioned to receive the plurality of tabs 120.

Next, housing portion 102 is rotatably positioned closer to housing portion 104 such that wall 110 meets with wall 160 and tabs 136, 138, and 140 insert within slots 117, 119, and 121. Tab 134 does not insert within a slot of slidable element 106, but is positioned adjacent thereto. Male and female connectors 152 and 197 (FIG. 1) mechanically and electrically connect. Thus, housing portions 102 and 104 are mated to form housing 412 (FIG. 4). FIGS. 4 and 6 show slidable element 106 in the open position where housing portions 102 and 104 are mated.

Next, slidable element 106 is slidably positioned further in a direction indicated by an arrow 408 of FIG. 4 and an arrow 602 of FIG. 6. As shown in FIG. 3, inside edges of tabs 134, 136, 138, and 140 have small rails defined thereon, each shaped and formed similar to the outside edge of tab 194 or small rail 202. The inside edges of tabs 134, 136, 138, and 140 are also slightly tapered (upwardly from left to right in FIG. 3, about 1° and not readily visible) so that housing portion 102 is drawn slightly inward towards housing portion 104 when slidable element 106 is moved to such position. Such tapering may provide some resistance in moving slidable element 106. After such positioning, slidable element 106 is in the closed position as shown in FIG. 7, where housing portions 102 and 104 are fastened together. The plurality of tabs 120 are captured or retained by slidable element 106 within rails 101 and 103.

Preferably, a gasket 504 (FIGS. 5–7) is disposed along and sandwiched in between mating perimeters 114 and 164 to form a seal between housing portions 102 and 104. Gasket 504 is made from a resilient material that does not take a set, and is preferably made from silicone or ureathane. Using gasket 504, a water-resistant seal between housing portions 102 and 104 is created. Other suitable gaskets (not shown) for housing 412 are also provided as needed to provide a water-resistant portable telephone that meets Japanese Industrial Standard (JIS) level-4.

Next, referring back to FIG. 4, batteries or a battery pack (not shown) are inserted within recess 158 and coupled to the electronic components via battery contacts (not shown) in recess 158. A detachable cover 414 is attached to housing portion 104 to cover the batteries and recess 158. Thus, opening 198 and positioning tab 123 are hidden from view and not readily accessible to a user. Housing 412 is assembled and, assuming other necessary components are in place, the portable communication device is ready for use.

To disassemble housing 412, cover 414 is detached from housing portion 104 and the batteries are removed. Next, positioning tab 123 is moved in a direction indicated by an arrow 702 of FIG. 7 so that slidable element 106 is positioned back in the open position as shown in FIGS. 4 and 6. Next, housing portion 102 is rotated away from housing portion 104 on the hinged side, where the plurality of tabs 120 are released through the plurality of slots 105. Housing 412 is disassembled and, for example, electronic components 144 may be examined or repaired.

Preferably, positioning of slidable element 106 is performed with a tool 400 shown in FIG. 4. Tool 400 is made from a durable material, preferably steel. Tool 400 defines a handle 402 and an end 404 forming a slot 406. Slot 406 is sized and shaped to receive positioning tab 123. Tool 400 is especially suitable where the resistance provided for moving slidable element 106 (such as that provided from the tapering of tabs 134, 136, 138, and 140) is relatively large.

Housing assembly 100, which basically requires only a single-motion action with slidable element 106 for assembly and disassembly, saves time during manufacturing and repair. A secure attachment and seal is provided between housing portions 102 and 104, particularly along the entire length of housing 412. The secure attachment and seal is especially desirable for devices such as hand-held portable electronic devices, which are subject to mechanical stresses and various weather conditions. Housing apparatus 100 does not detract from the appearance of the device, which is important in many consumer markets. Positioning tab 123 may be concealed and situated where it is not readily accessible to a user (such as in a compartment), which is important where user tampering and/or accidental disassembly is undesired. After slidable element 106 is positioned in the open position for disassembly, it is conveniently retained on the plurality of tabs 170 for subsequent reassembly.

While particular embodiments of the present invention have been shown and described, modifications may be made. For example, although housing assembly 100 is shown for use in a portable communication device, housing assembly 100 may be suitably sized and constructed for electronic devices of many applications. It is therefore intended in the appended claims to cover all such changes and modifications which fall within the true spirit and scope of the invention.

What is claimed is:

1. A housing assembly for an electronic device, comprising:
   a first housing portion;
   a second housing portion configured to mate with said first housing portion to form a housing; and
   a slidable element slidably disposed in said housing, said slidable element configured to slide unidirectionally into a first position for fastening said first and said second housing portions when said first and second housing portions are mated to form the housing, said slidable element configured to slide unidirectionally into a second position for unfastening said first and said second housing portions.

2. The housing assembly according to claim 1, wherein said first housing portion includes at least a first tab, wherein said slidable element is slidably disposed on said second housing portion, and wherein said slidable element is configured to retain said at least a first tab when in the first position.

3. The housing assembly according to claim 2, wherein said slidable element comprises a track, and wherein said track is configured to retain said at least a first tab when said slidable element is in the first position.

4. The housing assembly according to claim 2, wherein said slidable element comprises a track including a first rail and a second rail, and wherein said first rail includes at least a first slot to receive and release said at least a first tab when said slidable element is positioned in the second position.

5. The housing assembly according to claim 2, wherein said slidable element comprises a track including a first rail and a second rail, wherein said at least a first tab is retained within said track when said slidable element is positioned in the first position, and wherein said first rail includes at least a first slot to release said at least a first tab when said slidable element is positioned in the second position.

6. The housing assembly according to claim 1, wherein said slidable element includes a positioning tab, and wherein said housing defines an opening to access said positioning tab.

7. The housing assembly according to claim 1, wherein at least one of said first and said second housing portions forms a housing shell.

8. The housing assembly according to claim 1, wherein said slidable element includes a positioning tab, and wherein said housing includes an opening in a compartment to access said positioning tab.

9. The housing assembly according to claim 1, wherein said first housing portion defines a first mating perimeter and said second housing portion defines a second mating perimeter, said housing assembly further comprising:
   a gasket disposed between said first and said second mating perimeters to form a water-resistant seal for said housing assembly.

10. A portable communication device, comprising:
    a housing, including:
       a first housing shell having at least one tab;
       a second housing shell mating with said first housing shell;
       a slidable element slidably disposed on said second housing shell within said housing, said slidable element unidirectionally slidable to a first position to retain said at least one tab when the first and second housing shells are mated, said slidable element unidirectionally slidable to a second position to release said at least one tab, said slidable element having a positioning tab accessible from an opening defined by said housing; and
    a printed circuit board (PCB) disposed in said housing.

11. The portable communication device according to claim 10, wherein said opening is defined within a battery attachment area of said portable communication device.

12. The portable communication device according to claim 10, wherein said opening is defined within a battery compartment of said portable communication device.

13. The portable communication device according to claim 10, wherein said slidable element comprises a track, and wherein said track is configured to retain said at least one tab when said slidable element is positioned in the first position.

14. The portable communication device according to claim 10, wherein said slidable element comprises a track having a first rail and a second rail, and wherein said first rail includes at least one slot to receive and release said at least one tab when said slidable element is positioned in the second position.

15. The portable communication device according to claim 10, wherein said first housing shell defines a first mating perimeter and said second housing shell defines a second mating perimeter, said portable communication device further comprising:
   a gasket disposed between said first and said second mating perimeters to form a water-resistant seal for said portable communication device.

16. An electronic device, comprising:
   a first housing shell defining a first wall, said first housing shell including a first plurality of tabs positioned along an inside surface of said first wall;
   a second housing shell mating with said first housing shell, said second housing shell defining a second wall;
   a printed circuit board (PCB) disposed between said first and said second housing shells; and
   a slidable element slidably disposed along an inside surface of said second wall, said slidable element including a first rail having a first plurality of slots defined along the first rail, said first plurality of slots sized to retain and release said first plurality of tabs, wherein
      said slidable element is configured to slide unidirectionally into a first position to retain said first plurality of tabs with said first rail when said first and second housing shells are mated, and
      said slidable element is configured to slide unidirectionally into a second position to release said first plurality of tabs when said first and second housing shells are mated.

17. The electronic device according to claim 16, wherein said slidable element comprises a track including said first rail and a second rail.

18. The electronic device according to claim 16, wherein said second housing shell includes a second plurality of tabs positioned along said inside surface of said second wall, and wherein said slidable element is slidably disposed on said second plurality of tabs.

19. The electronic device according to claim 18, wherein said slidable element includes a second rail having a second plurality of slots defined therealong, and wherein said second plurality of slots are sized to receive said second plurality of tabs.

20. The electronic device according to claim 16, wherein said first housing shell defines a third wall substantially opposite said first wall and said second housing shell defines a fourth wall substantially opposite said second wall, and wherein said third and said fourth walls include hooks and hook acceptors.

21. The electronic device according to claim 16, wherein at least one of said first and said second housing shells includes an opening, and wherein said slidable element includes a positioning tab accessible through said opening.

22. The electronic device according to claim 16, wherein said first housing shell defines a first mating perimeter and said second housing shell defines a second mating perimeter, said electronic device further comprising:
   a gasket disposed between said first and said second mating perimeters to form a water-resistant seal for said electronic device.

* * * * *